United States Patent
Johnson et al.

(10) Patent No.: US 8,888,495 B2
(45) Date of Patent: Nov. 18, 2014

(54) MOBILE MEDICAL TRAINING PLATFORM AND METHOD OF USE

(75) Inventors: Clara Johnson, Sioux Falls, SD (US);
Travis Spier, Sioux Falls, SD (US);
Shaye Krcil, Rapid City, SD (US); Gary Myers, Sioux Falls, SD (US)

(73) Assignee: The Leona M. and Harry B. Helmsley Charitable Trust, New York, NY (US)

( * ) Notice: Subject to any disclaimer, the term of this patent is extended or adjusted under 35 U.S.C. 154(b) by 55 days.

(21) Appl. No.: 13/473,818

(22) Filed: May 17, 2012

(65) Prior Publication Data

US 2012/0315612 A1 Dec. 13, 2012

Related U.S. Application Data

(60) Provisional application No. 61/494,596, filed on Jun. 8, 2011.

(51) Int. Cl.
G09B 19/00 (2006.01)
G09B 5/06 (2006.01)
G09B 23/28 (2006.01)
G09B 23/30 (2006.01)

(52) U.S. Cl.
CPC *G09B 5/06* (2013.01); *G09B 23/28* (2013.01); *G09B 23/30* (2013.01)
USPC .......................................................... 434/219

(58) Field of Classification Search
USPC ........................ 434/219, 262–275; 607/4–5
See application file for complete search history.

(56) References Cited

U.S. PATENT DOCUMENTS

| | | | |
|---|---|---|---|
| 4,535,933 A | 8/1985 | Kuiper | |
| 4,538,995 A | 9/1985 | Fryer | |
| 5,706,616 A | 1/1998 | Fernandez | |
| 5,743,050 A | 4/1998 | Shibata | |
| 6,082,799 A | 7/2000 | Marek | |
| 6,205,716 B1 | 3/2001 | Peltz | |
| 6,625,252 B2 | 9/2003 | Mirabella | |
| 7,008,230 B2 | 3/2006 | Hoglund | |
| 7,347,472 B2 | 3/2008 | Pellegrin, Jr. | |
| 7,749,089 B1 | 7/2010 | Briggs | |
| 7,794,001 B2 | 9/2010 | Blackwell | |
| 2003/0060808 A1 | 3/2003 | Wilk | |
| 2004/0161731 A1* | 8/2004 | Arington et al. | 434/262 |
| 2004/0201239 A1 | 10/2004 | Pellegrin, Jr. | |
| 2006/0101727 A1 | 5/2006 | Holgerson | |
| 2006/0286524 A1 | 12/2006 | Boyers | |
| 2009/0282749 A1 | 11/2009 | Warminsky | |
| 2010/0052351 A1 | 3/2010 | Sartin | |
| 2010/0167248 A1 | 7/2010 | Ryan | |
| 2010/0227303 A1 | 9/2010 | Deering | |
| 2011/0041415 A1 | 2/2011 | Esposito | |

* cited by examiner

*Primary Examiner* — Timothy A Musselman
(74) *Attorney, Agent, or Firm* — Jeffrey A. Proehl; Woods, Fuller, Shult & Smith, P.C.

(57) ABSTRACT

A mobile medical simulation platform for training medical emergency personnel comprises a mobile base movable between remote geographical locations. The mobile base may include a main enclosure having a forward end and a rearward end and defining an interior space. The base may also include medical equipment in the interior space of the main enclosure and usable in medical simulation training for treating a human patient, and simulation apparatus configured to provide simulation of medical events and conditions of a human patient. The interior space is separated into an ambulance simulation area and an emergency room simulation area contained in the main enclosure to permit simultaneous simulation training exercises to occur in each of the simulation areas. A method of utilizing the platform may include conducting training at a first location, moving the platform to a second location, and conducting training at the second location.

19 Claims, 19 Drawing Sheets

MOBILE MEDICAL TRAINING PLATFORM AND METHOD OF USE

BACKGROUND

Field

The present disclosure relates to medical training systems and more particularly pertains to a new mobile medical training platform, and method of use, for providing training for emergency medical in a realistic environment in remote locations.

SUMMARY

The present disclosure describes a new mobile medical training platform and method of use which provides a system for implementing emergency medical training in remote locations and remote areas, and may enhance the uniformity of the content and quality of the training.

In one aspect, the present disclosure relates to a mobile emergency medical simulation platform that provides a mobile and transportable environment for conducting emergency medical training at remote locations in a realistic environment with patient simulators that are able to simulate a variety of different emergency medical conditions and events.

In another aspect, the disclosure relates to a mobile medical simulation platform for training medical emergency personnel. The platform may comprise a mobile base movable between remote geographical locations, with the mobile base including a main enclosure having a forward end and a rearward end and defining an interior space. The platform may also include medical equipment in the interior space of the main enclosure and usable in medical simulation training for treating a human patient and simulation apparatus configured to provide simulation of medical events and conditions of a human patient. The interior space may be separated into an ambulance simulation area and an emergency room simulation area contained in the main enclosure to permit simultaneous simulation training exercises to occur in each of the simulation areas.

In yet another aspect, the disclosure relates to a method of training emergency medical personnel utilizing a mobile medical simulation platform, and includes moving the simulation platform to a first location, conducting medical training at the first location, moving the simulation platform to a second location that is remote from the first location, and conducting medical training at the second location.

In still another aspect, the disclosure relates to a method of training medical personnel using a portable medical simulation platform. The method may comprise providing a portable medical simulation platform comprising a mobile base movable between remote geographical locations, with the mobile base including a main enclosure defining an interior space separated into an ambulance simulation area and an emergency room simulation area and further including medical equipment in the interior space usable in medical simulation training and simulation apparatus configured to provide simulation of medical events and conditions of a human patient. The method may further include moving the platform to a first location to conduct medical training of a first group of medical personnel, conducting training in the simulation areas of the platform in the first location with the first group of personnel, moving the platform from the first location of training to a second location to conduct medical training with a second group of personnel, and conducting training in the simulation areas of the platform in the second location with the second group of personnel.

In some implementations of the method, at least one of the steps of conducting training includes conducting training exercises in both of the simulation areas substantially simultaneously. Also, in some implementations at least one of the steps of conducting training includes transferring a patient simulator from the ambulance simulation area to the emergency room simulation area by one of the groups of medical personnel. Further, in some implementations at least one of the steps of conducting training includes communicating information between the ambulance simulation area and the emergency room simulation area via an electronic device.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter.

In this respect, before explaining at least one embodiment or implementation in greater detail, it is to be understood that the scope of the disclosure is not limited in its application to the details of construction and to the arrangements of the components, as well as the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
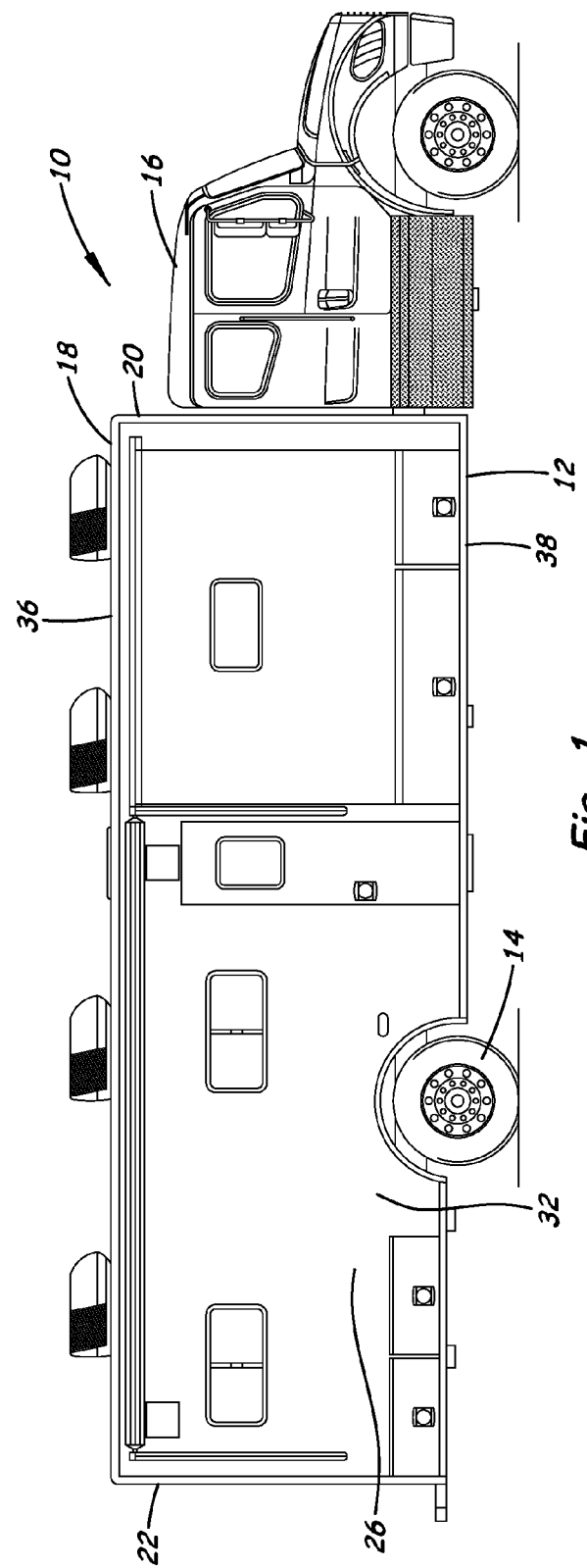
FIG. 1 is a schematic view of the exterior of the curb or passenger side of an illustrative embodiment of a new mobile medical training platform according to the present disclosure.

With reference now to the drawings, and in particular to FIGS. 1 through 19 thereof, a new mobile medical training platform and method of use embodying the principles and concepts of the disclosed subject matter will be described.

The applicants have recognized a need for the ability to provide medical training, and in particular emergency medical training, in remote locations that is highly realistic and substantially uniform in content and quality, particularly in geographical areas that are sparsely populated and may not have emergency medical training facilities. Emergency medical personnel serving these remote areas have the same emergency medical assessment and treatment requirements as medical personnel serving other less remote areas. Rural areas, for example, have sparse populations, limited medical facilities that are widely separated, yet still have the need to be able to treat patients just as those patients would be treated in denser populated areas with more and better equipped medical facilities. Thus, the emergency medical personnel serving these rural areas need to receive training comparable to medical personnel in more urban areas. However, the geographical remoteness of medical personnel living and working in these rural areas may make it difficult for these persons to attend training that is often provided in more urbanized areas. Applicants have thus devised a system for making highly realistic emergency medical training portable to these remote locations so that these medical personnel can receive the benefit of the training without the personnel having to travel long distances.

Perhaps most significantly, the applicants have also recognized that training including emergency medical situation simulation that is conducted with of ambulance personnel and emergency room personnel at separate times and separate spaces often fails to accurately simulate the interaction that often occurs between these personnel during the treatment of patients during responses to medical emergencies. In other words, it has become apparent to the applicants that training that does not reflect the real timer interaction between ambulance and emergency room personnel fails to recognize the reality that, in real life emergency medical care situations, there is significant and critical verbal and physical interaction between personnel in each of these areas (and often even an overlap in the personnel) as a patient is transferred from the ambulance to the emergency room. Training for these areas that occurs as separate events, and focuses on training for these emergency events at separate times and in separate spaces, may fail to adequately prepare the personnel for making this transfer of the patient. For example, communication between ambulance personnel and emergency room personnel, whether remote or in person, is critical to the transfer of the patient in an effective and safe manner.

The applicants have devised a system in which the interaction between the ambulance personnel and the emergency room personnel is more realistically simulated and practiced than heretofore known, bringing the training by simulation together in terms of time and space without requiring the use of an ambulance or an emergency room. Further, the system may provide the trainers with the ability to closely observe (and then provide feedback to) the trainees in a manner that would not be possible in an actual ambulance or emergency room environment without also interfering with the realism of the simulation.

In one aspect of the disclosure, a mobile medical simulation platform 10 will be described that is highly useful for providing highly realistic emergency medical training in environments that simulate the environments in which actual medical services, and in particular emergency medical service, are provided, while allowing the platform to be moved from location to location, even over long distances, so that the medical training in such realistic environments can be performed in remote locations, such as rural areas that may not have the simulation facilities available for hands-on training activities.

Figure 2:
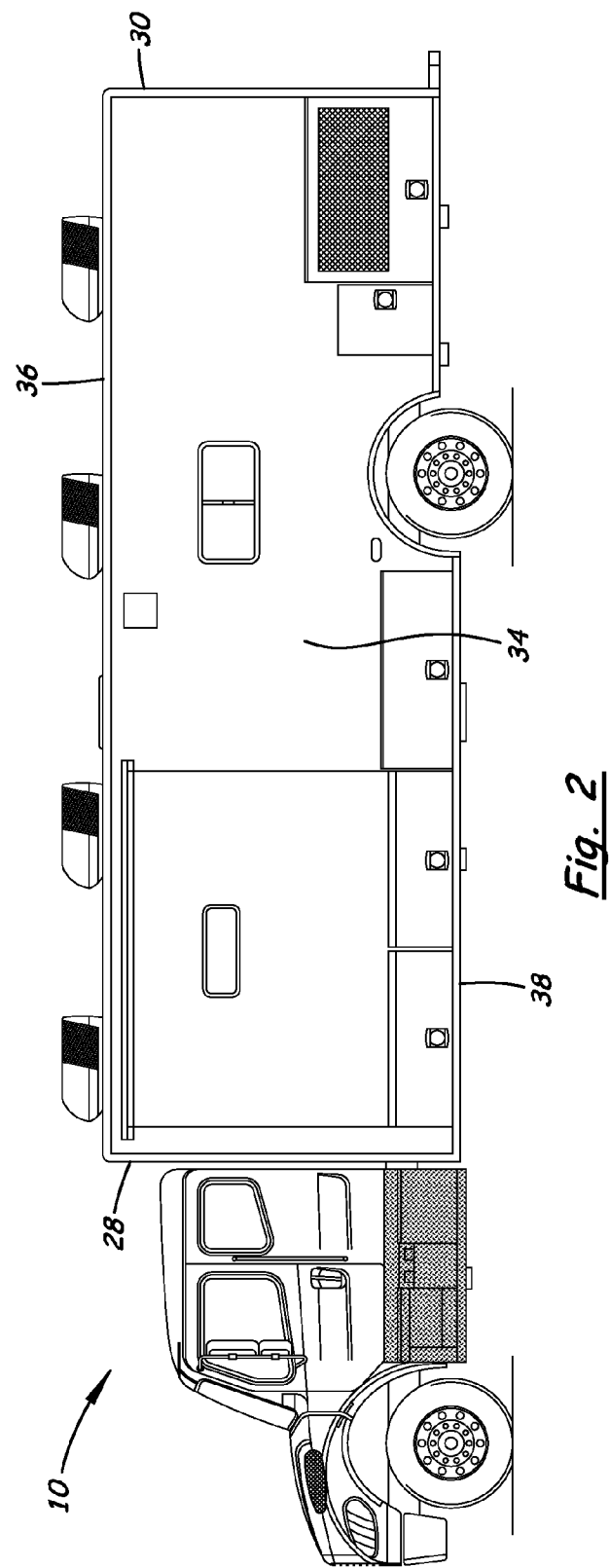
FIG. 2 is a schematic view of the exterior of the street or driver side of the illustrative embodiment of the mobile medical training platform.
Figure 3:
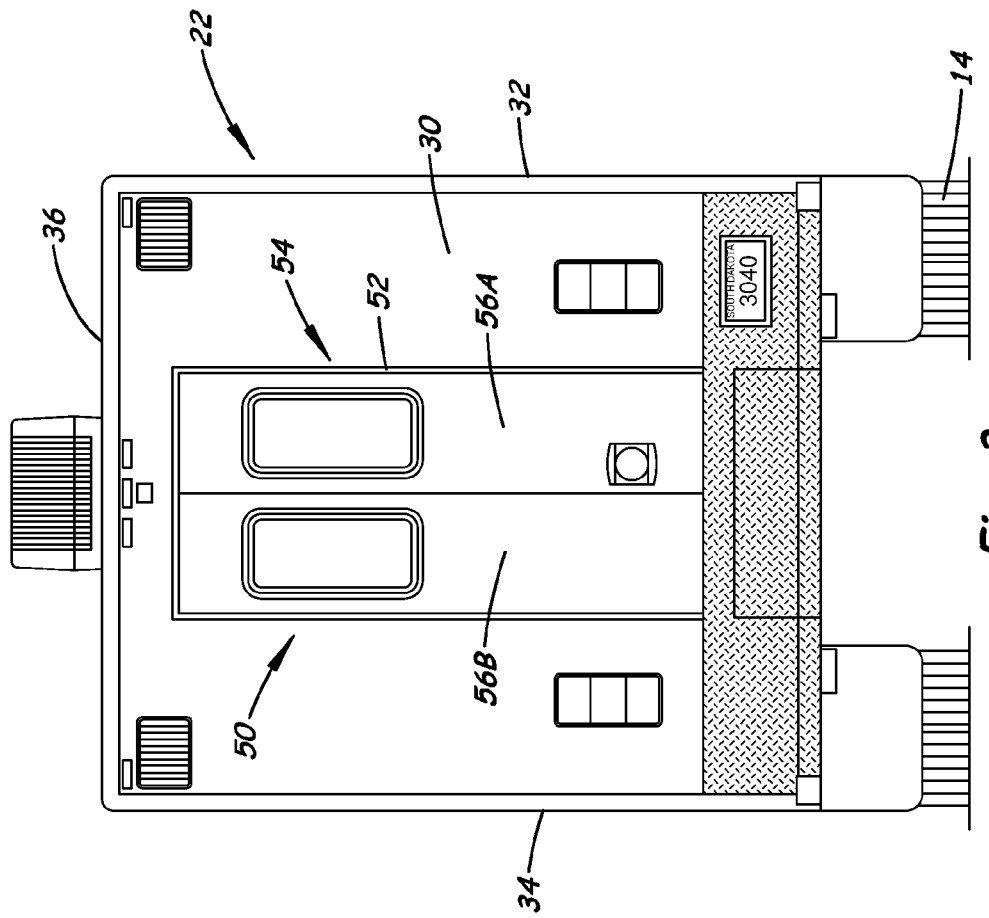
FIG. 3 is a schematic rear view of the illustrative embodiment of the platform.
Figure 4:
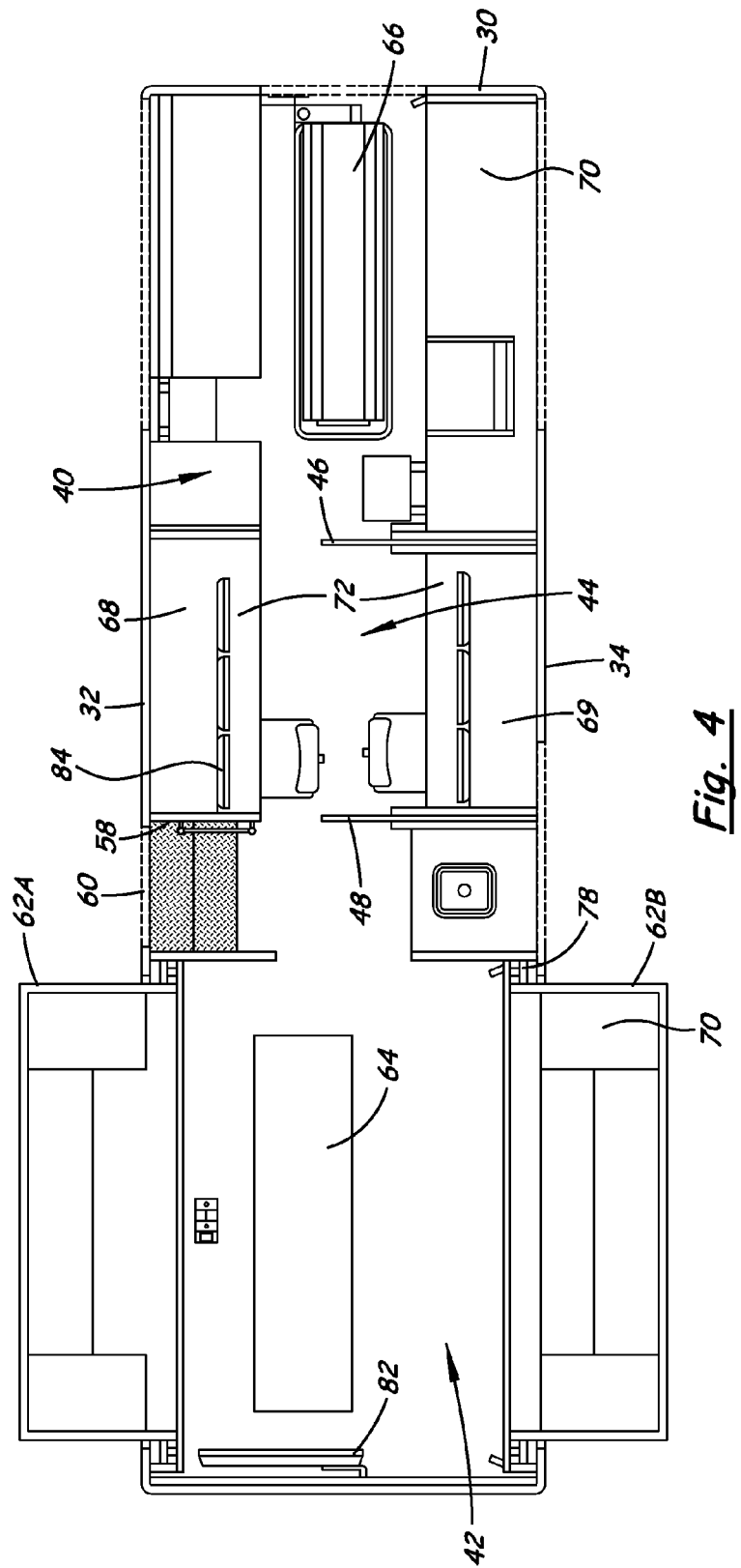
FIG. 4 is a schematic top view of the illustrative platform, with the roof removed to reveal details of the interior space and areas.
Figure 5:
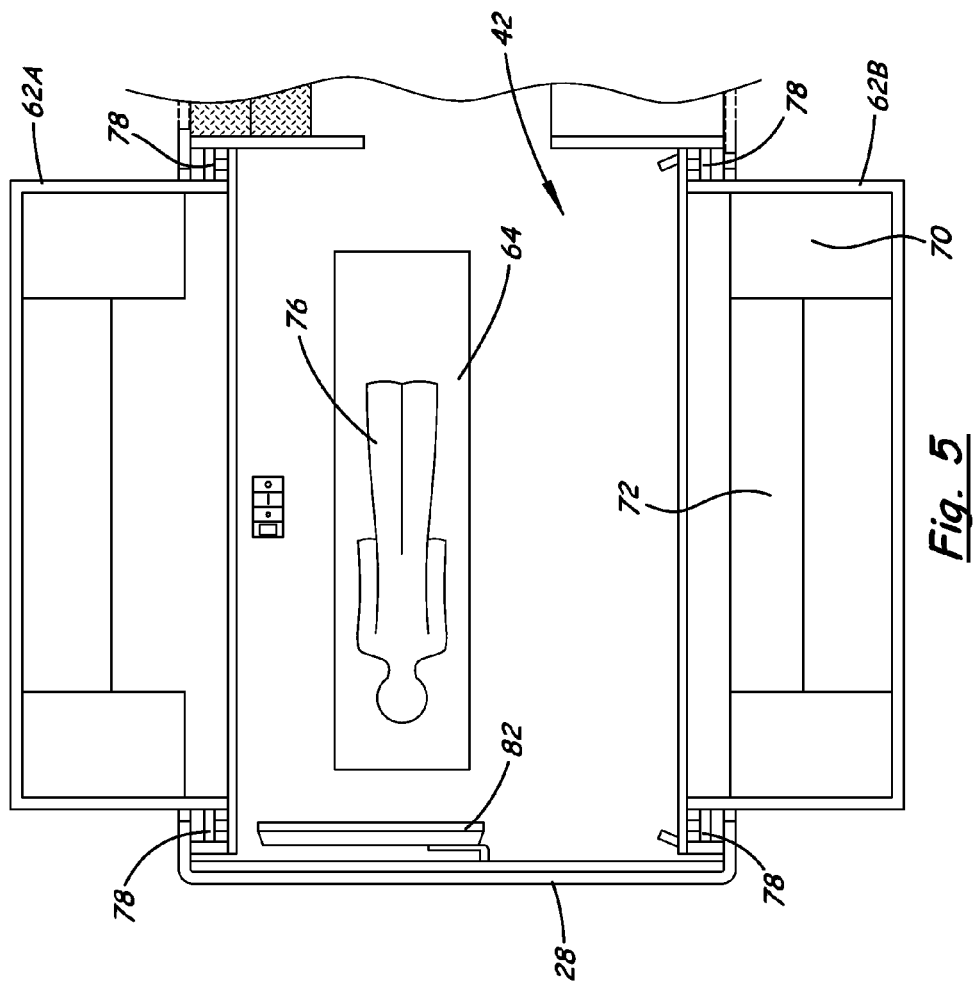
FIG. 5 is a schematic enlarged top view of a portion of the illustrative embodiment of the platform, particularly showing the emergency room simulation area of the interior space with the slide out structures in the simulation configuration.
Figure 6:
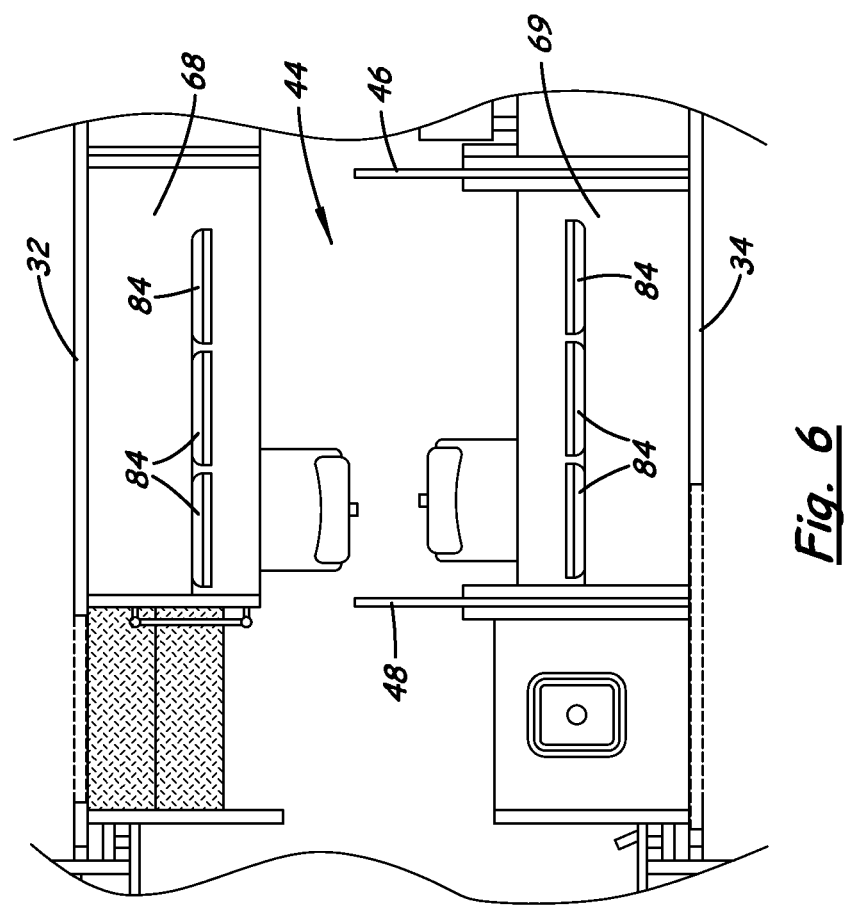
FIG. 6 is a schematic enlarged top view of a portion of the illustrative embodiment of the platform, particularly showing the control area of the interior space.
Figure 7:
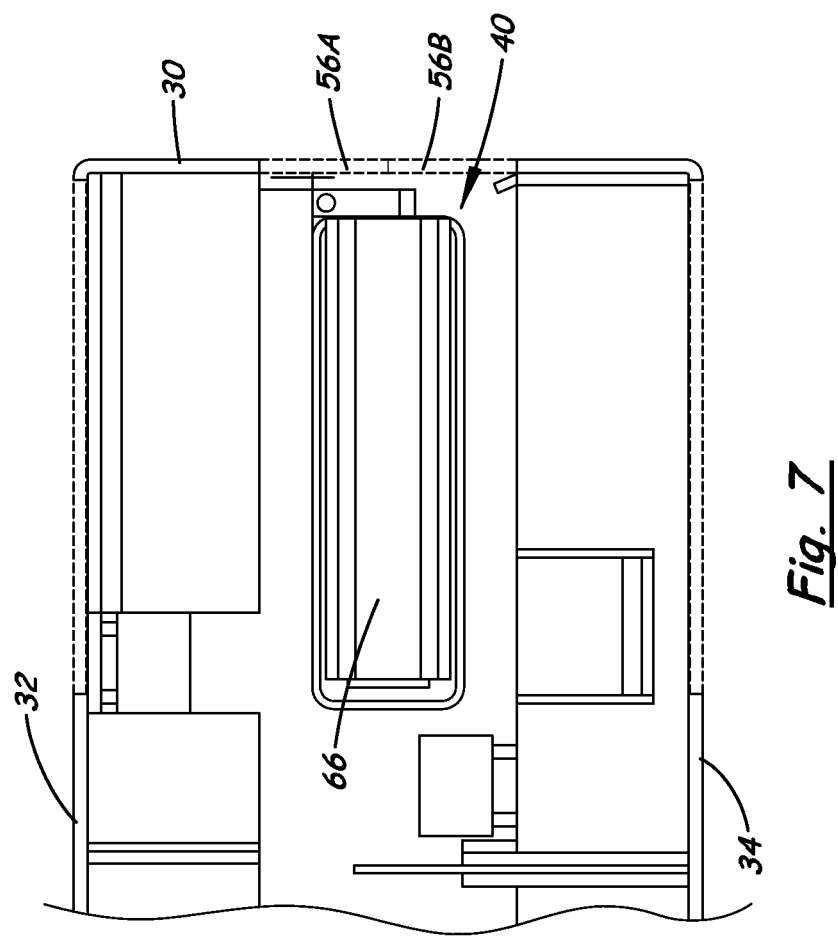
FIG. 7 is a schematic enlarged top view of a portion of the illustrative embodiment of the platform, particularly showing the ambulance simulation area of the interior space.
Figure 8:
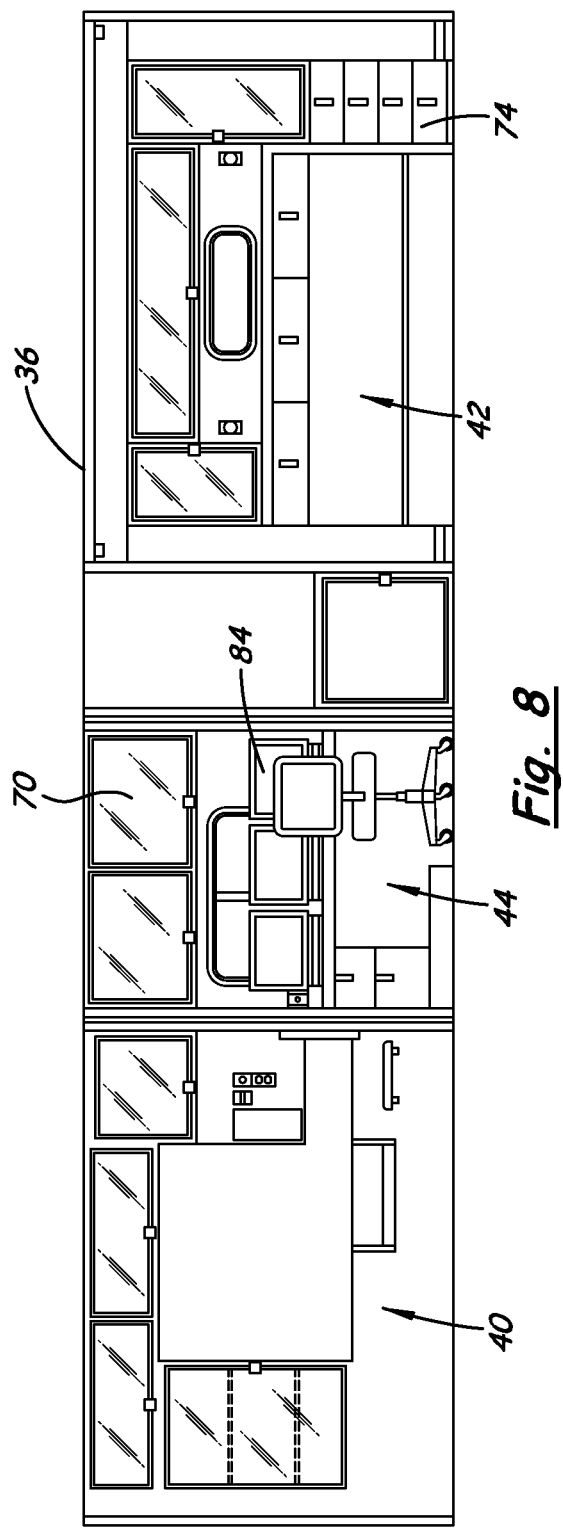
FIG. 8 is a schematic view of the interior of the street or driver side portion of the perimeter wall of the main enclosure of the illustrative embodiment.
Figure 9:
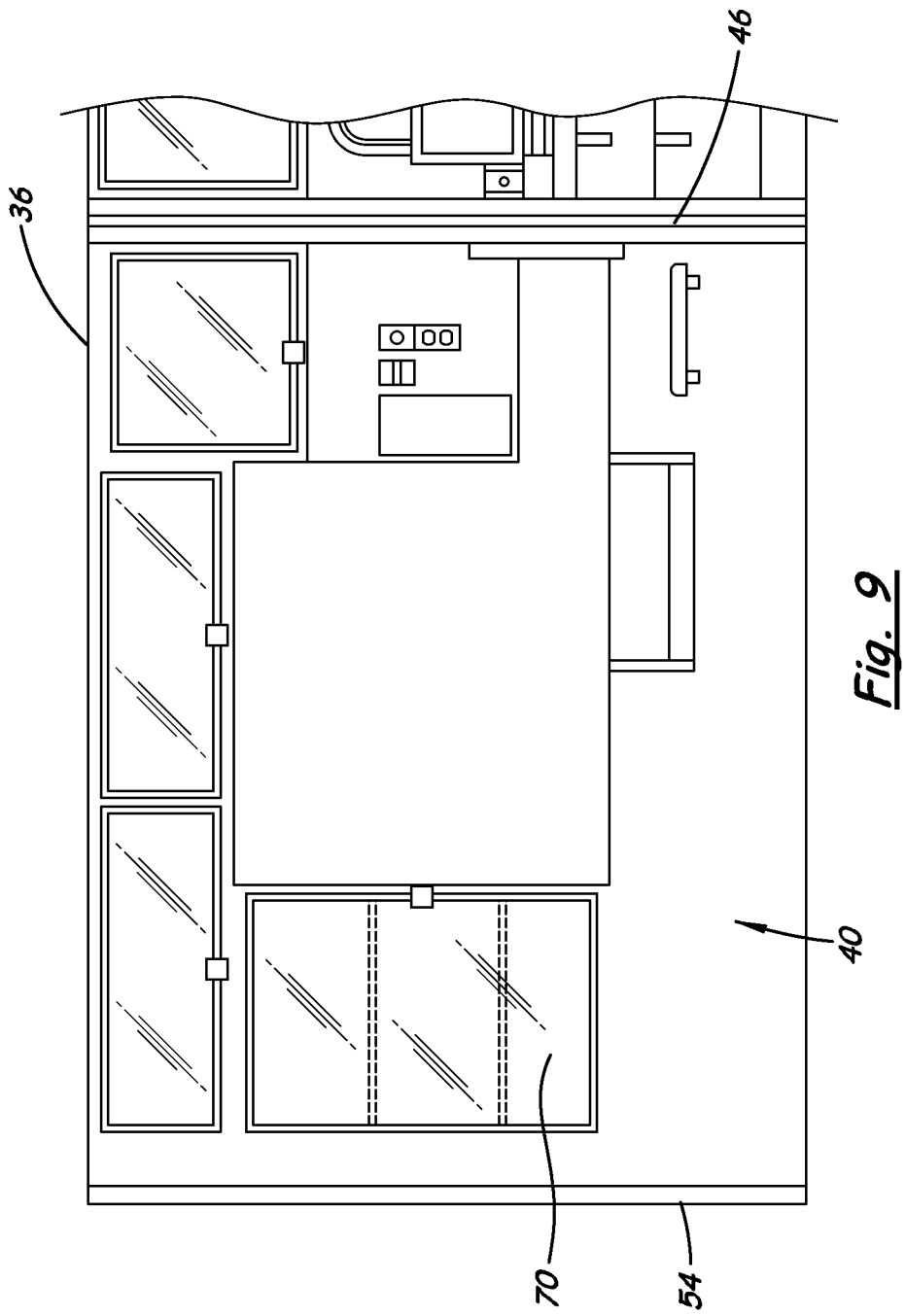
FIG. 9 is a schematic view of a portion of the interior of the street side portion of the perimeter wall showing detail of the ambulance simulation area of the illustrative embodiment.
Figure 10:
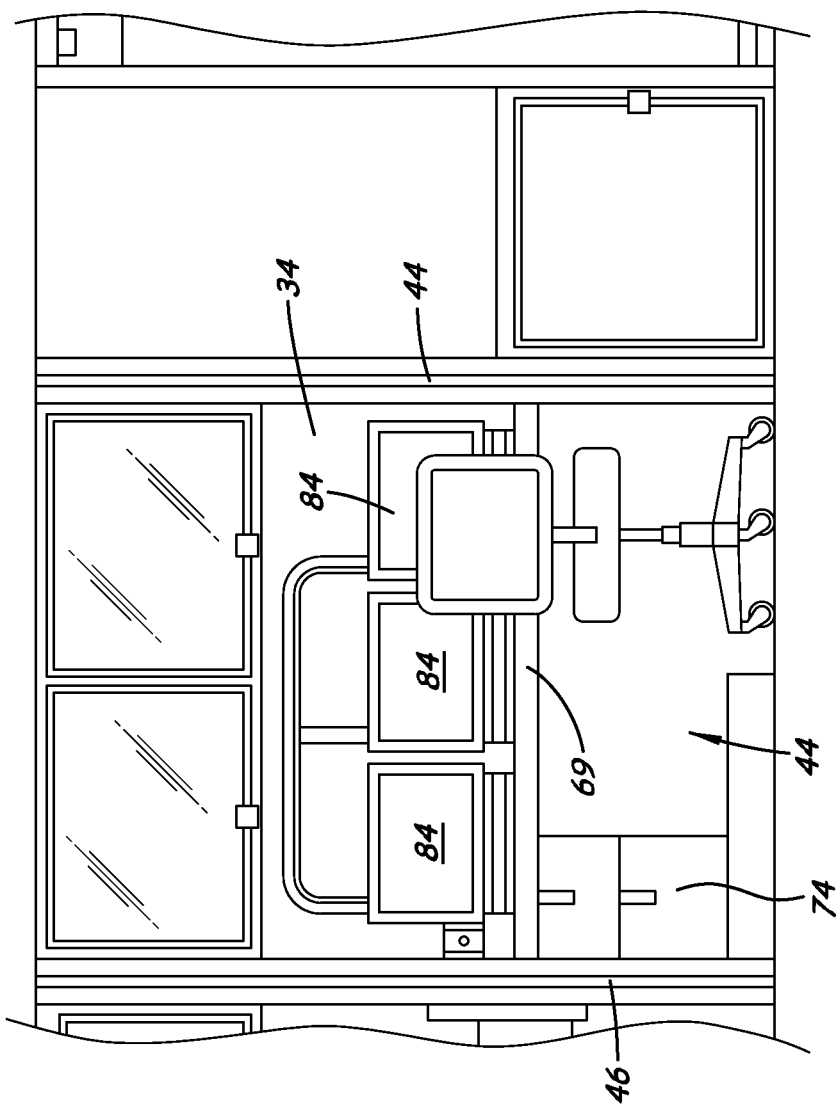
FIG. 10 is a schematic view of a portion of the interior of the street side portion of the perimeter wall showing detail of the control area of the illustrative embodiment.
Figure 11:
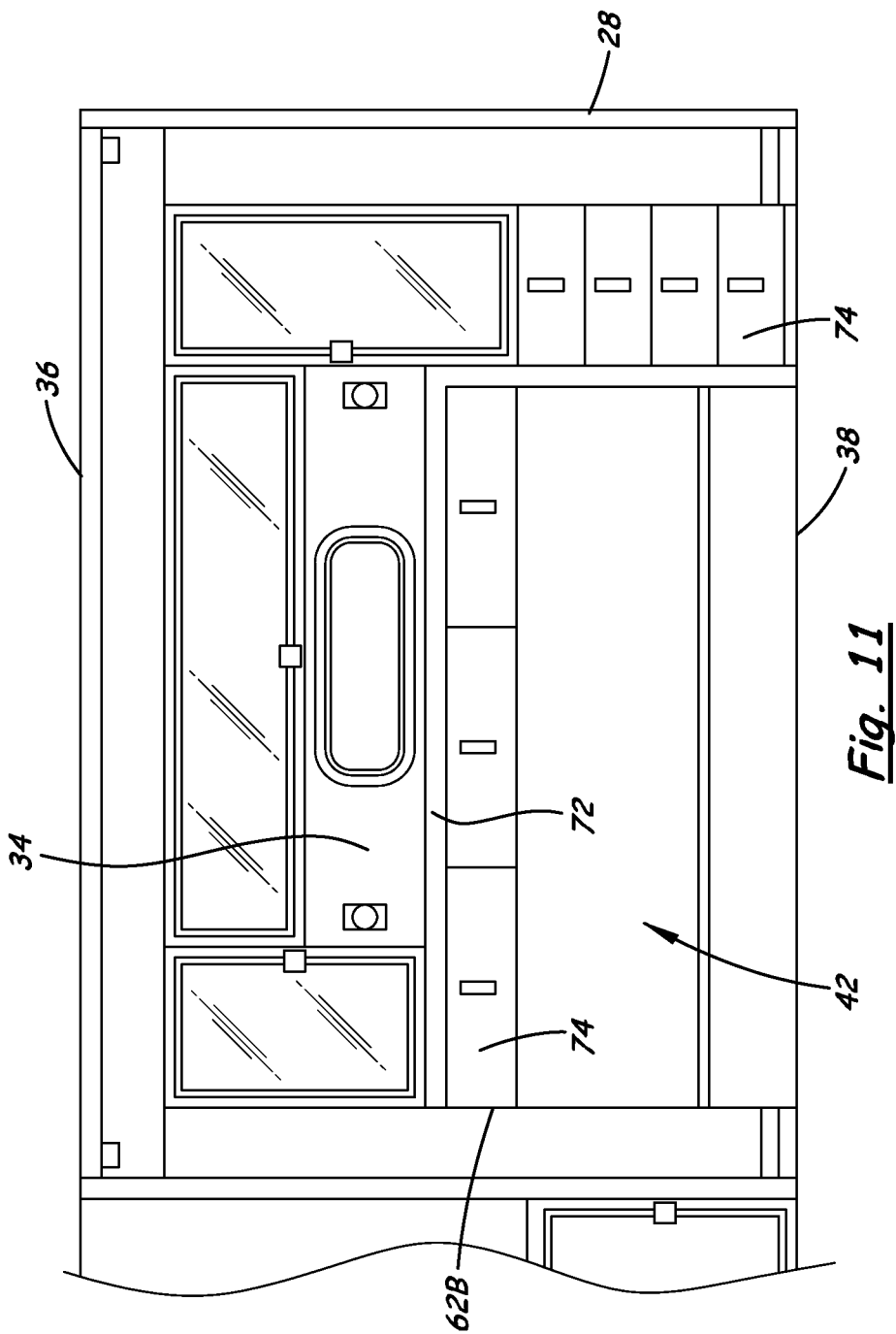
FIG. 11 is a schematic view of a portion of the interior of the street side portion of the perimeter wall showing detail of the emergency room simulation area of the illustrative embodiment.
Figure 12:
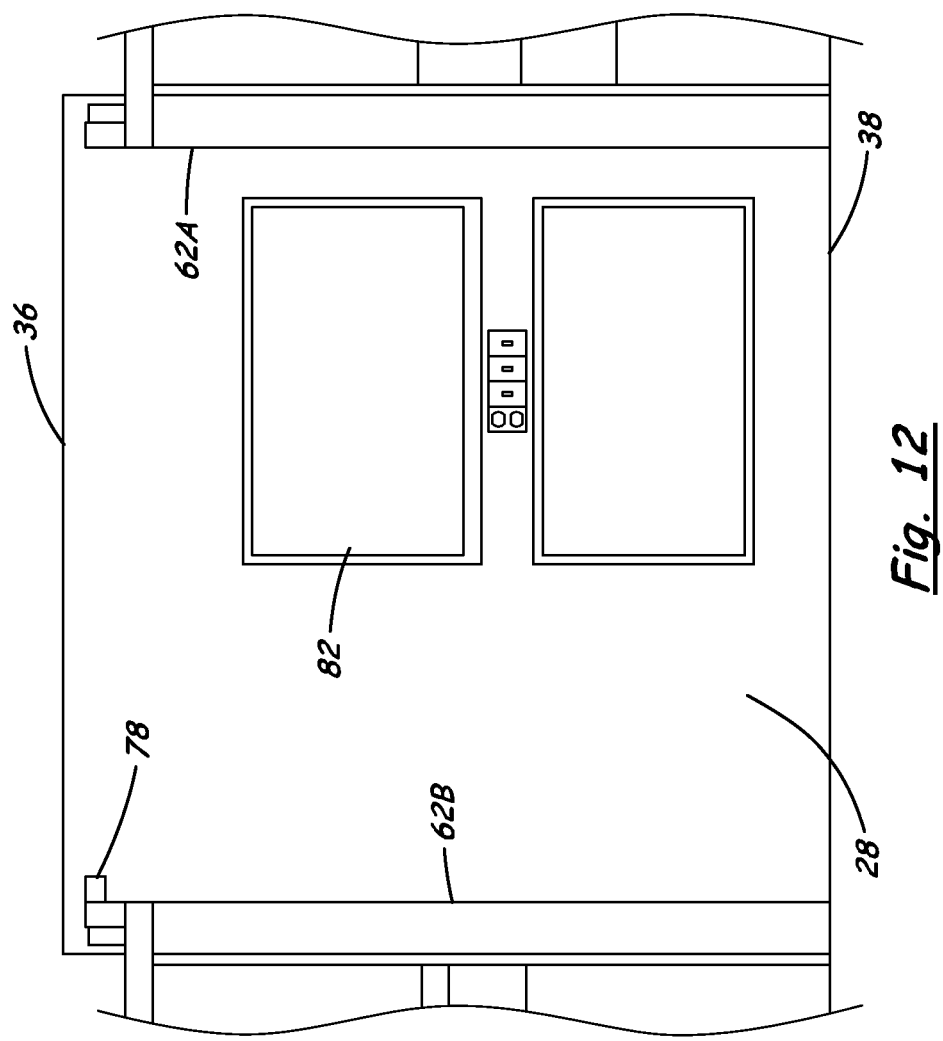
FIG. 12 is a schematic view of the interior of the forward portion of the perimeter wall of the main enclosure in the emergency room simulation area of the illustrative embodiment.
Figure 13:
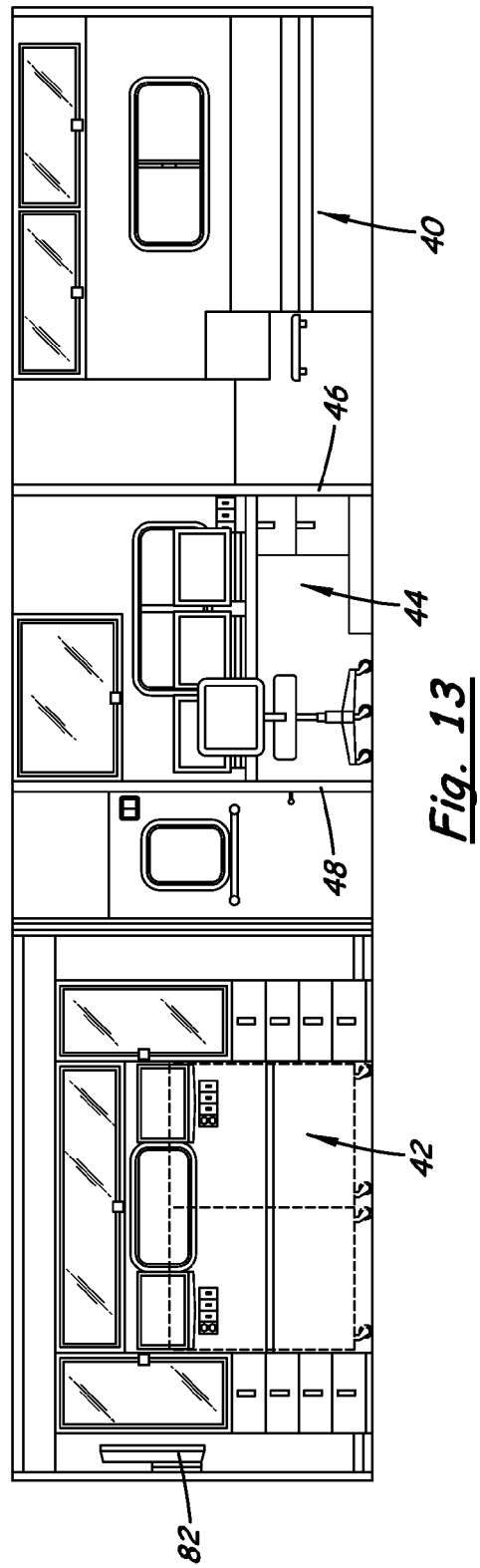
FIG. 13 is a schematic view of the interior of the curb or passenger side portion of the perimeter wall of the main enclosure of the illustrative embodiment.
Figure 14:
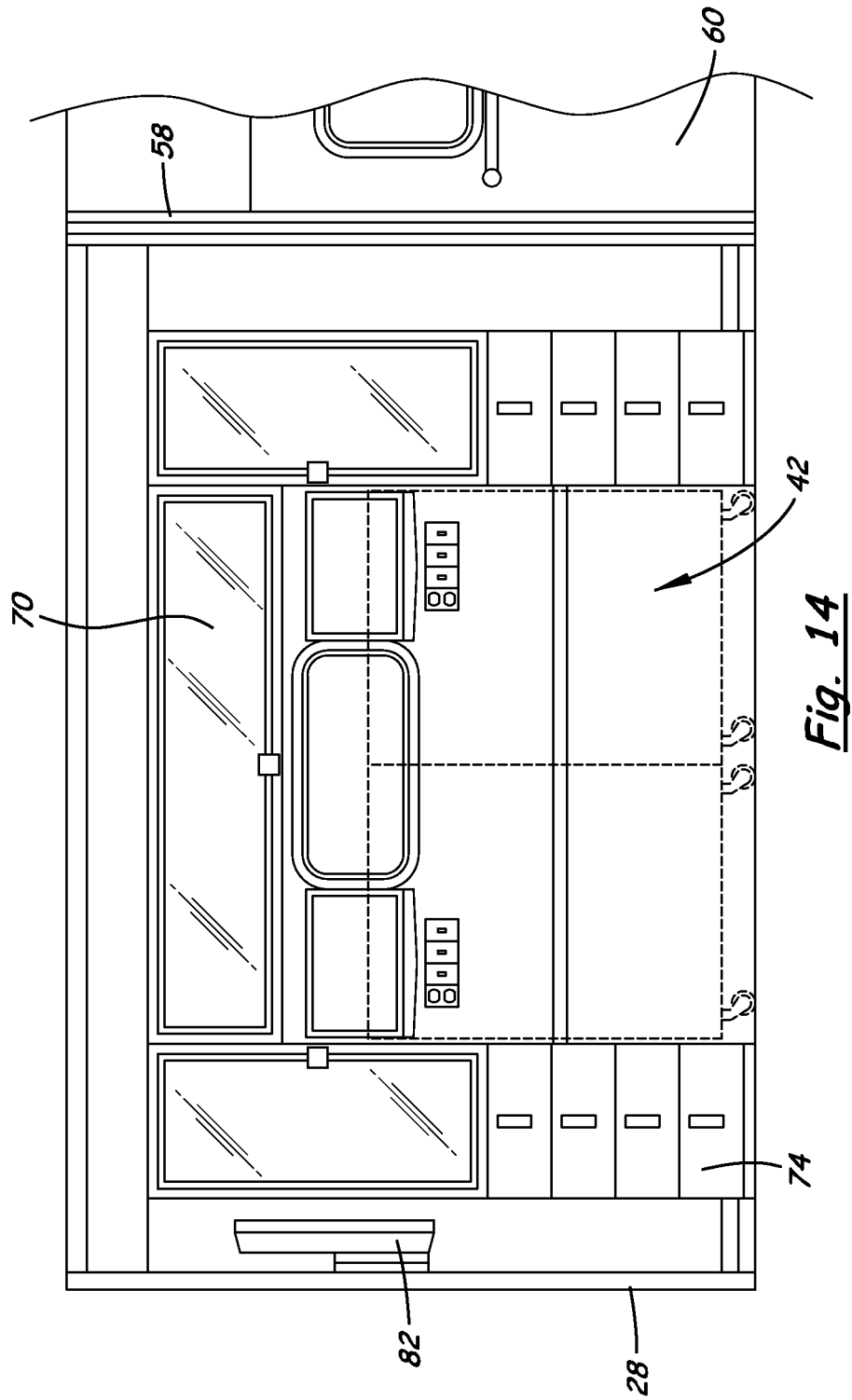
FIG. 14 is a schematic view of a portion of the interior of the curb side portion of the perimeter wall showing detail of the emergency room simulation area of the illustrative embodiment.
Figure 15:
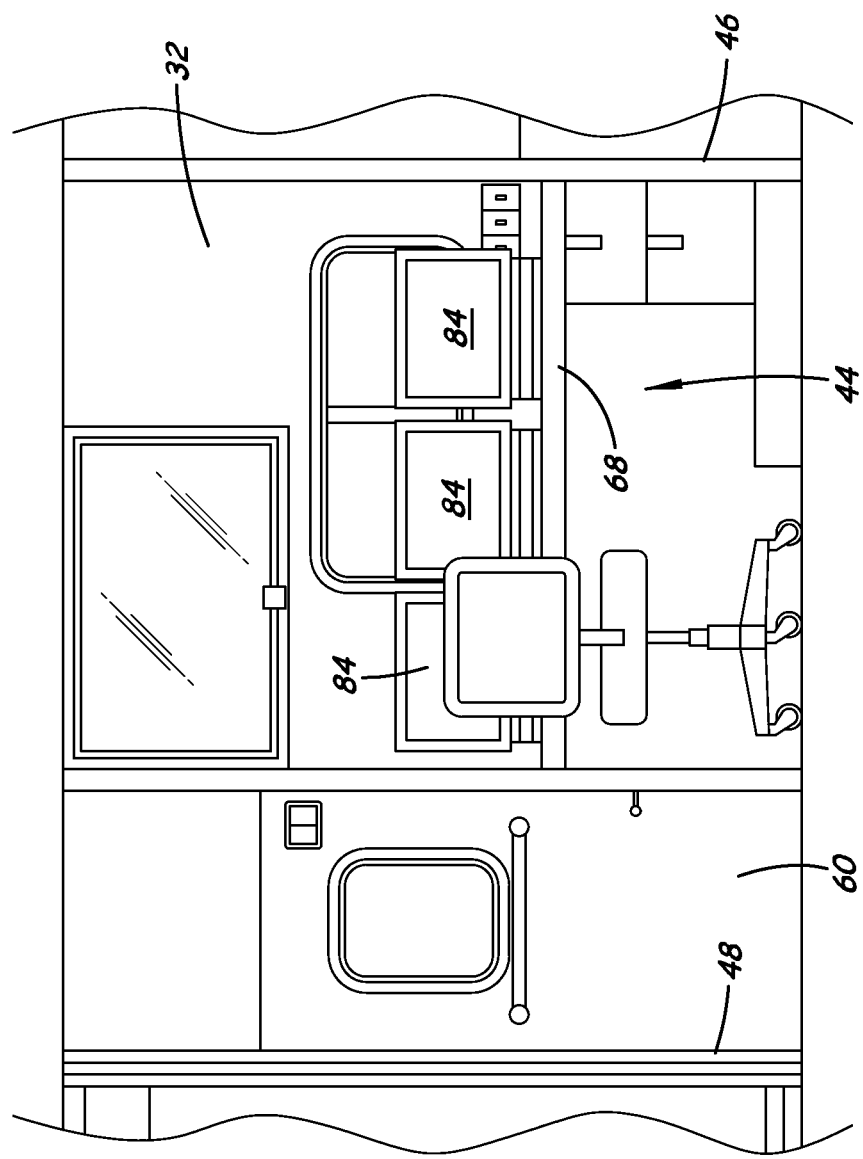
FIG. 15 is a schematic view of a portion of the interior of the curb side portion of the perimeter wall showing detail of the control area of the illustrative embodiment.
Figure 16:
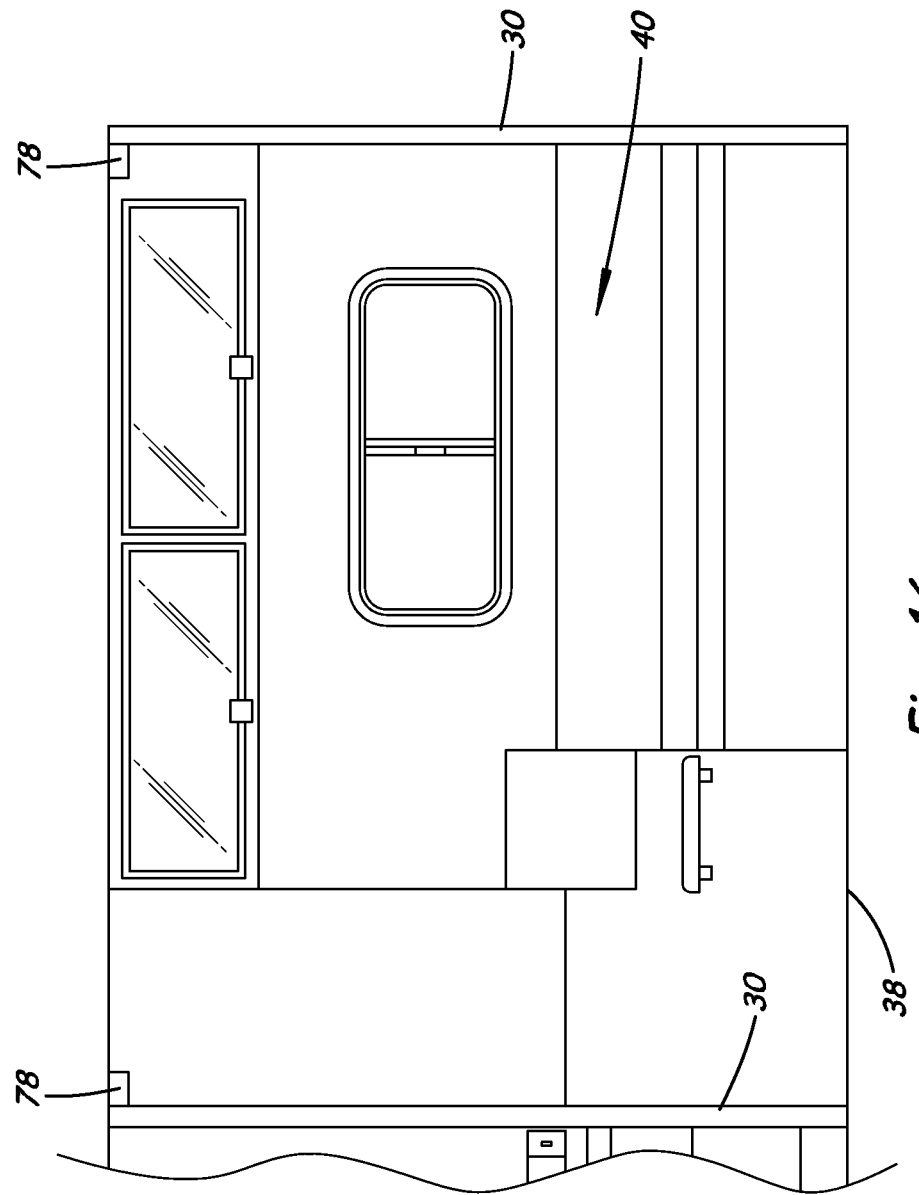
FIG. 16 is a schematic view of a portion of the interior of the curb side portion of the perimeter wall showing detail of the ambulance simulation area of the illustrative embodiment.
Figure 17:
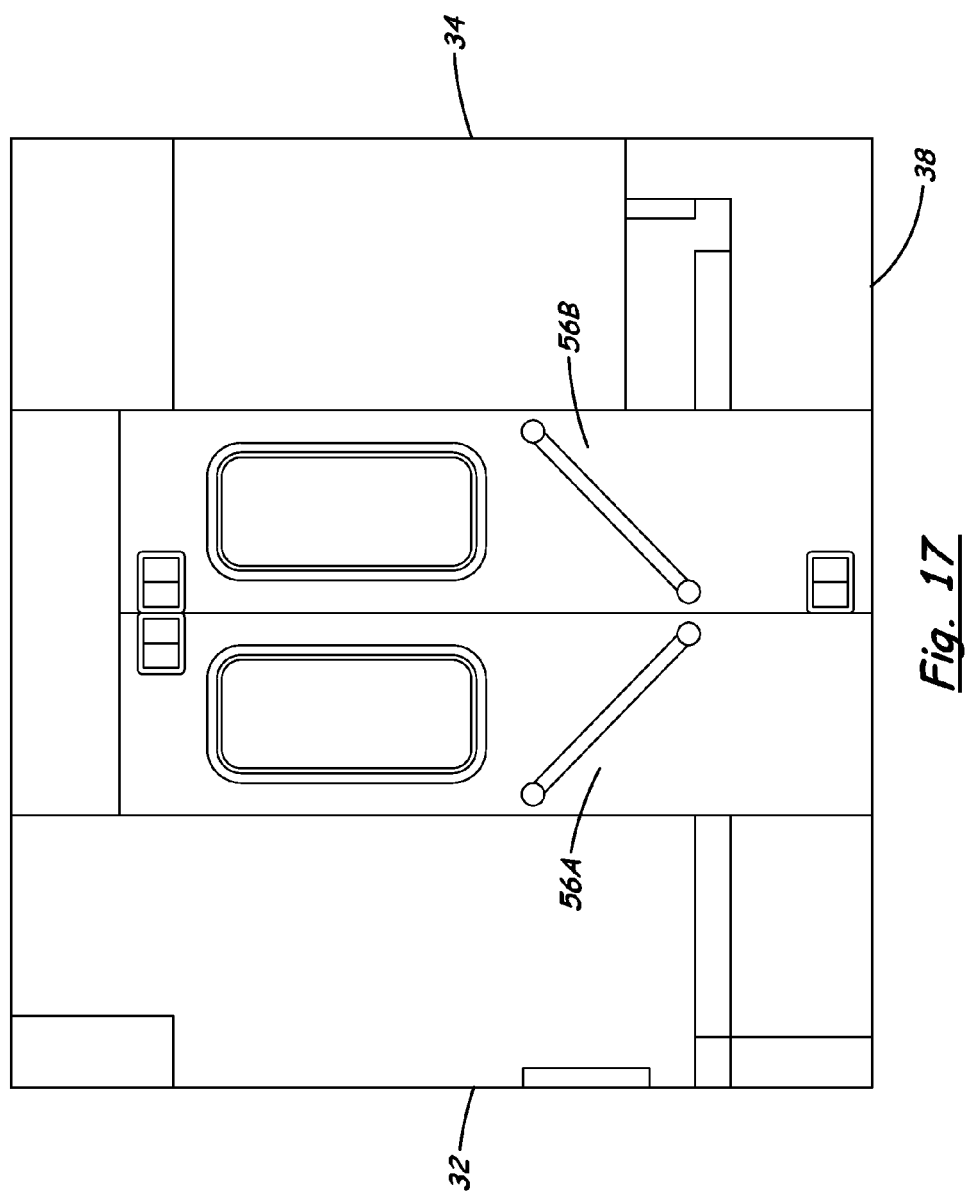
FIG. 17 is a schematic view of the interior of the rearward portion of the perimeter wall of the main enclosure in the ambulance simulation area of the illustrative embodiment.
Figure 18:
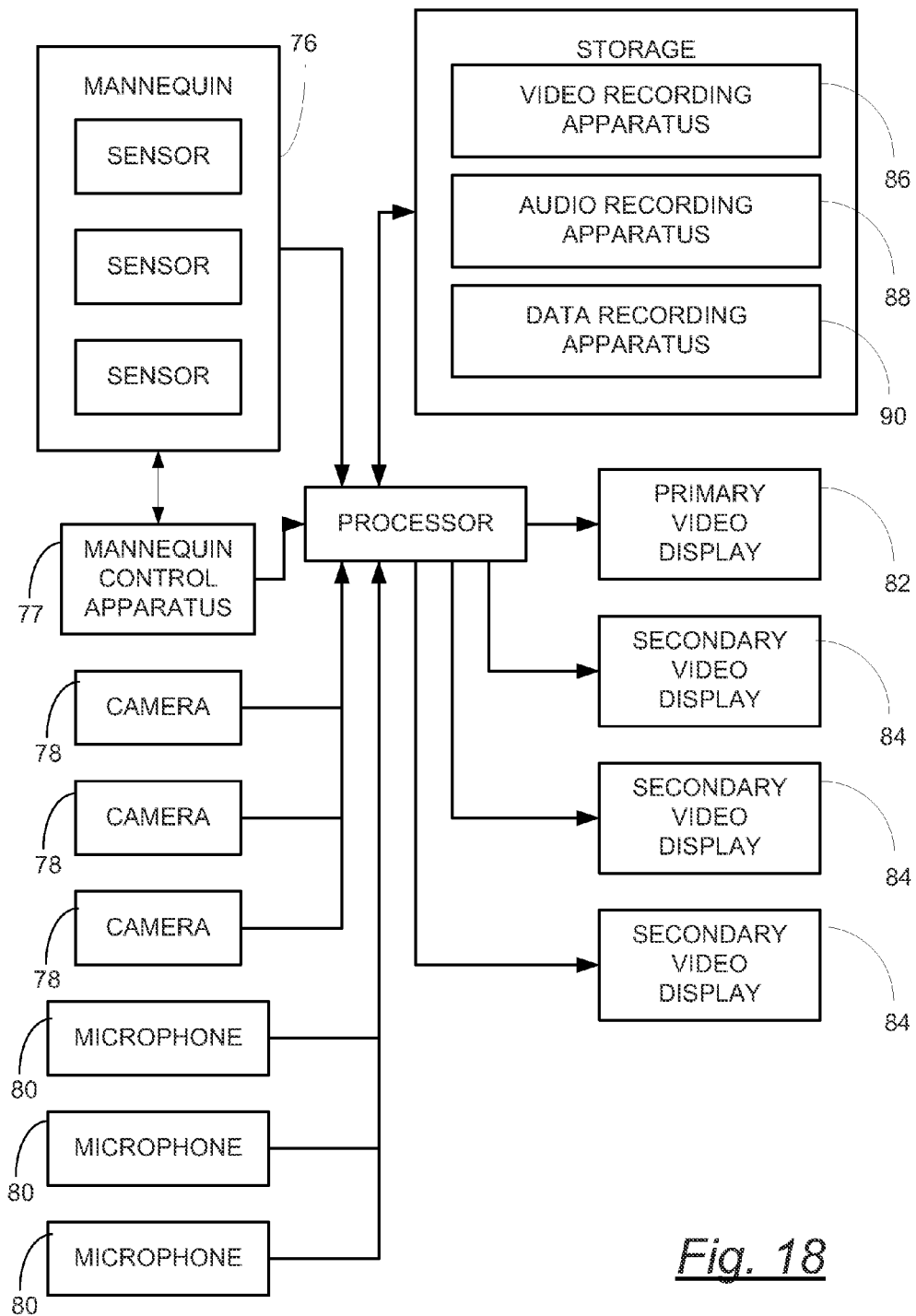
FIG. 18 is a schematic diagram of relationships between elements of the platform of the illustrative embodiment.
Figure 19:
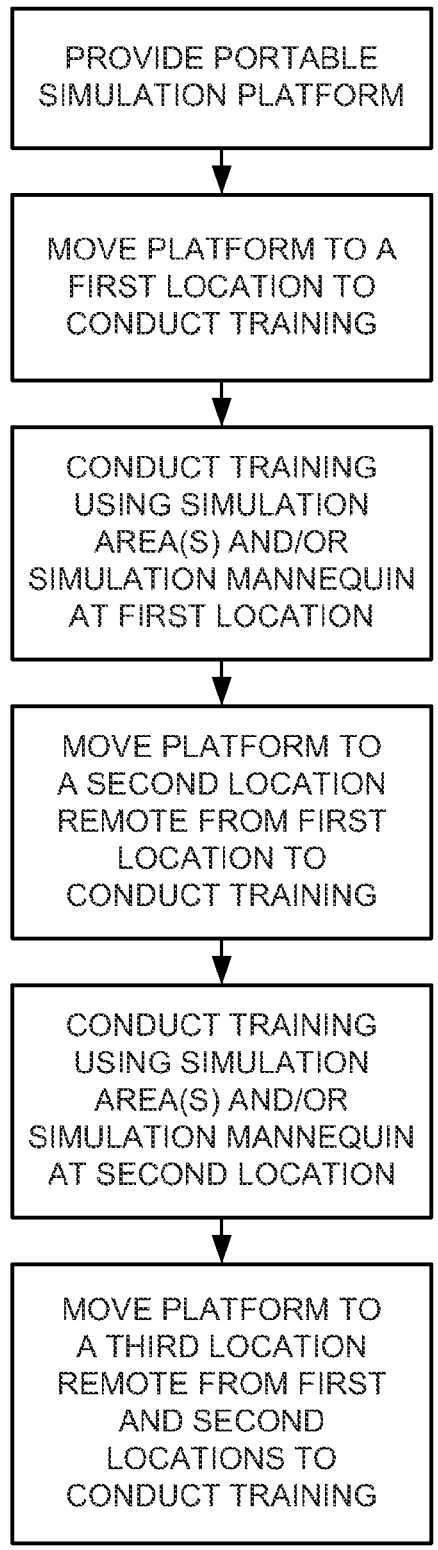
FIG. 19 is a schematic flow diagram of aspects of the method of the disclosure.

The platform 10 may include a mobile base 12 that is movable, and preferably is movable or transportable between remote geographical locations that may be hundreds and even thousands of miles apart. The mobile base 12 may have wheels 14 mounted thereon to roll over roads between the remote geographical locations. In the most preferred embodiments, the mobile base 12 comprises a vehicle (as shown in FIGS. 1 through 3) with a motor or engine incorporated in the vehicle for moving the vehicle under its own power. Optionally, the mobile base 12 could be a trailer that is pulled behind another vehicle, although that type of configuration is less preferred. The more preferred vehicle configuration of the mobile base 12 may include a cab 16 that is able to hold a driver and one or more additional people, and may in some embodiments include two bench seats and four doors for training personnel.

The mobile base 12 may further include a main enclosure 18. In the illustrative embodiments in which the mobile base is a vehicle, the main enclosure is mounted on the frame of the vehicle and is positioned behind the cab 16. The main enclosure 18 may have a forward end 20 that is positioned toward a front of the mobile base, and a rearward end 22 which is positioned toward a rear of the mobile base. In one illustrative embodiment, the main enclosure has a length of approximately 360 inches (approximately 914 cm) and a width of approximately 100 inches (approximately 254 cm), although other sizes may be utilized.

The main enclosure 18 encloses and defines an interior space 24 which is sufficiently large to accommodate at least one human adult, and preferably several adults. In the previously mentioned illustrative embodiment, the area of the interior is approximately 250 square feet (approximately 23 m$^2$), although this precise size is not critical and may have areas of at least approximately 150 square feet (approximately 14 m$^2$), and may have areas less than approximately 300 square feet (approximately 28 m$^2$).

The main enclosure 18 may include a perimeter wall 26 extending about the interior space of the enclosure. The perimeter wall 26 is substantially vertically oriented and may extend substantially continuously about the interior space. The perimeter wall 26 may include a forward portion 28, a rearward portion 30, and a pair of side portions 32, 33 that connect the forward and rearward portions. The first side portion 32 may be located toward the curb of a street (curbside) when the vehicle is traveling down a street or road, which is sometimes referred to as the passenger's side of the vehicle. The second side portion 34 may be located toward the center of the street (street side) when the vehicle is traveling down a street or road, which is sometimes referred as the driver's side of the vehicle. The main enclosure may also include a ceiling wall 36 extending to the portions of the perimeter wall to close the top end of the perimeter wall, and a floor wall 38 that similarly extends to the portions of the perimeter wall but oppositely closes the bottom end of the perimeter wall.

One significant aspect of the platform 10 is the configuration of areas within the interior space 24 of the main enclosure. The interior space 24 may include an ambulance simulation area 40, and may also include an emergency room simulation area 42. Additionally, the interior space 24 may include a control area 44. The areas of the interior space 24 may be in communication with each other such that a person in one area is not blocked from moving into another one of the areas. Another significant aspect of the platform is that the ambulance simulation area 40 may be positioned toward the rearward end 22 of the main enclosure which enhances the realism of the simulation of the ambulance space. The emergency room simulation area 42 may be positioned toward the forward end 20 of the main enclosure, and may thus be positioned opposite of the ambulance simulation area in the interior space of the main enclosure. The ambulance simulation area 40 may be separate of the emergency room simulation area 42 to permit simultaneous simulations and training to occur in each of the simulation areas without interference with each other.

The control area 44 may be positioned between the emergency room simulation area and the ambulance simulation area, and may provide an observation point for activities occurring in either or both of the simulation areas 40, 42. In some embodiments, a first separation panel 46 may be movably positioned between the ambulance simulation area 40 and the control area 44, and may be slidable between an open condition and a closed condition. The closed condition may be characterized by the first separation panel being positioned to restrict movement of persons between the ambulance simulation area and the control area, and the open position may be characterized by the first separation panel being positioned to allow movement of persons between the ambulance simulation area and the control area. A second separation panel 48 may be movably positioned between the emergency room simulation area 42 and the control area 44 and may be slidable between an open and closed condition. The closed condition may have the second separation panel positioned to restrict movement of persons between the emergency room simulation area and the control area, and the open condition may have the second separation panel positioned to allow movement of persons between the emergency room simulation area and the control area. In some embodiments, the separation panels 46, 48 may include selectively transparent material (such as glass) that permits one way viewing and observation through the panels from one space to the other space, but not in reverse. For example, the glass in the separation panels 46, 48 may permit viewing from the control area into the ambulance simulation area and into emergency room simulation area, but not from these areas into the control area, so that training personnel may be able to observe simulation activities and training exercises conducted in the areas 40, 42 from the control area without being observed by the trainees.

In some greater detail, the ambulance simulation area 40 may be configured and arranged to simulate the interior space of an ambulance so that simulation and training conducted in the ambulance simulation space is more easily transferred to real life events that occur in an actual ambulance. One significant feature of the ambulance simulation area is an ambulance training entrance 50 that provides access to the ambulance simulation area. The ambulance training entrance 50 may be positioned on the rearward end 22 of the main enclosure in a location adjacent to the ambulance simulation area. The ambulance training entrance 50 may include an ambulance simulation opening 52 that is located in, and extends through, the rearward portion 30 of the perimeter wall. The ambulance training entrance 50 may also include an ambulance simulation door 54 that is mounted on the rearward portion 30 of the perimeter wall to selectively close the ambulance simulation opening 52. The ambulance simulation door 54 may comprise a pair of door panels 56A, 56B that are mounted on the rearward portion 30 to close the simulation opening 52 in the rearward end 22 of the main enclosure. The utilization of the opening 52 and the door panels 56A, 56B permits the movement of a patent stretcher into the ambulance simulation area from the exterior of the platform 10 in a manner that is highly similar to moving a stretcher holding a patient into an actual ambulance.

Additionally, an access opening 58 may be located in one of the side portions 32 of the perimeter wall, and an access door 60 may be mounted on the side portion 32 to selectively close the access opening. This opening 58 may provide direct access to the emergency room simulation area and/or the control area from the exterior of the enclosure.

The emergency room simulation area 42 may be expandable between a transport configuration in which the volume of space in the emergency room simulation area 42 is relatively smaller and a simulation configuration (see FIGS. 4 and 5) in which the volume of space in the emergency room simulation area is relatively larger. The volume of the simulation area 42 is relatively larger in the simulation configuration than the volume of the ambulance simulation area in the transport configuration. To provide this expandability, the main enclosure 18 may include one or more slide out structures 62A, 62B that are able to move or slide outwardly in a lateral direction with respect to a central longitudinal axis of the main enclosure. The slide out structures are moved laterally inwardly, thus reducing the lateral width of the main enclosure, to attain the transport condition, and the slide out structures are moved laterally outwardly, thus increasing the interior space of the main enclosure, to attain the simulation condition. The relative increase in the interior space facilitates the simulation of an emergency room that may typically have a wider space than the lateral width of the main enclosure in the transport condition would provide. In the most preferred embodiments, a pair of the slide out structures is employed to provide the greatest degree of increase in interior space.

The platform 10 may also include medical equipment usable in emergency medical simulation training for treating a patient. The medical equipment may be located at least partially in the interior space 24 of the mobile base, and most of the medical equipment will be completely located in the interior space so that the equipment is easily transported from one location to another location. The medical equipment is accessible by a person in the interior space of the mobile base, and may be stored in various suitable manners, such as in cabinets and drawers. The medical equipment may include at least one examination table 64, which may be positioned in the emergency room simulation area 42. The medical equipment may also include at least one stretcher 66, which may be positioned in the ambulance simulation area 40. The stretcher 66 is removable from the ambulance simulation area 40 through the ambulance training entry 50. The stretcher is also movable between the ambulance simulation area and the emergency room simulation area, through the control area, and may thus be utilized instead of an examination table in the emergency room simulation area. The medical equipment may also include other supplies typically found in actual emergency rooms and ambulances, such as an oxygen supply, suction device, diagnostic equipment, and the like.

The platform 10 may also include administrative equipment positioned, for example, in the control area. The administrative equipment may include at least one desk 68, which may be positioned against one of the side portions of the perimeter wall. In some embodiments, a pair of desks 68, 69 may be employed with each desk being positioned against the opposite side portions of the perimeter wall. Cabinets 70 may be included in the main enclosure for holding various supplies, and may include cabinets positioned above the desks and in upper locations above the counters 72 on the slide out structures 62. Drawers 74 may be located below the desks 68, 69 and the counters 72. Various provisions for seating may be provided in the interior space, such as chairs located in the control area adjacent to the desks. Also, various flip or fold down seats and benches may be located in the ambulance simulation area in a manner that simulates the location of benches and seats in the interior of a typical ambulance.

Another aspect of the platform 10 may be the simulation apparatus that is useful for simulating emergency medical events and conditions of a person. The simulation apparatus may include at least one patient simulation mannequin 76 that may be positioned in either the emergency room simulation area or the ambulance simulation area, and in embodiments of the platform in which more than one simulation mannequin is used, a mannequin may be positioned in each of these areas. The mannequins may be positioned on the examination table 64 in the emergency room simulation area, and on the stretcher 66 in the ambulance simulation area. Examples of suitable mannequins include the ISTAN adult simulator available from METI, 6200 Edgelake Drive, Sarasota, Fla. 34240; PEDIASIM child simulator also available from METI; and BABYSIM baby simulator, also available from METI. Other simulators are available from METI and other vendors known to those skilled in the art. Such simulation mannequins are able to be controlled to exhibit various symptoms and conditions that personnel attending the training sessions may react to, and the simulation mannequins may sense the actions of the personnel with respect to the mannequins. The controlling apparatus 77 for the mannequin may be located in the control area 44 so that control of the mannequin may be conducted in isolation from the simulation areas where the mannequin(s) may be located, which may be most significant when the personnel need to "speak" through the mannequin in order to simulate patient reaction and interaction with the medical personnel being trained. Further, a track may be mounted on the ceiling wall, and on the track a lifting apparatus may be mounted that permits the lifting of the mannequin on to and off of the examination table, as well as moving the mannequin between the simulations areas for various training sessions.

The platform 10 may also include simulation monitoring apparatus that is configured to detect and record simulation sessions or events that occur in the simulation areas of the interior space, so that the actions of the personnel may be observed, for example, in the control area or in a location remote from the platform, and may be observed in real time (e.g., substantially simultaneous with the occurrence of the event being observed) or at a later time after the training session. The simulation monitoring apparatus may include a plurality of sensors for sensing events occurring during training sessions. The sensors may include one or more cameras 78 for sensing visual aspects of the events of the training sessions for viewing at locations other than the simulation area and at times other than the training session. The cameras may include video cameras, and at least some of the cameras may be mounted at a high location, such as on the ceiling wall 36 of the main enclosure. Other sensors may be utilized, such as microphones 80 for sensing audible sounds, as well as the sensors incorporated into the simulation mannequins 76 for detecting the actions of the personnel with respect to the mannequin. Such sensors may be linked to control circuitry either wirelessly or through suitable cabling and interfaces.

The simulation monitoring apparatus may also include a plurality of display devices in the interior space for displaying information from the sensors, or other sources such as prerecorded instructional media videos. In some embodiments, the display devices may include one or more primary video displays 82 which may be mounted on the perimeter wall, such as on the forward portion 28. Such a display may be utilized, as an example, for showing training videos and presentations. Additionally, a plurality of secondary video displays 84 may be utilized, and each of the secondary video displays may be configured to display video from a different one of the cameras. The secondary video displays 84 may be positioned, for example, in the control area and on or above one of the desks 68, 69 such that personnel in the control area may observe the video being captured by the cameras while remaining outside of the simulation areas.

Additionally, the simulation monitoring apparatus may also include recording apparatus for recording information detected by the sensors. The recording apparatus may include video recording apparatus 86 for recording video images sensed by the cameras 78, audio recording apparatus 88 for recording audible sounds sensed by the microphones 80, and data recording apparatus 90 for recording various data signals such as, for example, data sensed by sensors in the mannequins.

The configuration of elements of the main enclosure may provide a number of benefits. The positioning of the control area between the ambulance and emergency room simulation areas permits the training personnel (or trainers) to observe the personnel being trained (or trainees) in both the ambulance and emergency room simulation areas. The observation may occur through the separation panels and through the cameras and other monitoring equipment, without the trainer having to physically insert herself or himself into the respective simulation area during the exercise in order to understand what is occurring. The configuration of the main enclosure also permits the trainers to control aspects of the simulation exercise (such as the patient simulator) from the vantage point of the control area where the trainers cannot readily be observed by the trainees, and thus the actions of the trainees are less likely to be affected by the trainers even through the trainers are close by the trainees, and the trainers are able to react quickly and realistically to the actions taken by the trainees.

Also, during the training exercise, the trainees located in the ambulance simulation area and the trainees located in the emergency room simulation area are able to communicate with each other much as they would in an actual medical emergency when separated by a significant distance as a patient is transported by ambulance to the emergency room facility. The communication may simulate real life situations where communication, such as over radio or telephone, involves the description of patient conditions and other patient status information prior to the arrival of the ambulance at the medical facility housing the emergency room. Trainers in the control area are able to observe these communications in real time.

The proximity of the ambulance simulation area to the emergency room simulation area in the main enclosure allows for easy and quick movement of the patient simulator between the ambulance and emergency room simulation areas, to simulate the transfer or hand off of the patient from the ambulance personnel to the emergency room personnel during the training exercise simulating a medical emergency. The patient simulator, with stretcher and other medical equipment, may be moved from the ambulance simulation area to the emergency room simulation area through the control area of the platform during the transfer without leaving the main enclosure.

In another aspect, a method for utilizing the mobile medical simulation platform 10 for training emergency medical and other personnel in different and remote locations is disclosed. The method may include providing a platform of the type having at least some of the features set forth above for the platform 10, and in particular a platform that is mobile and portable and that thus may be moved from one location to another with the locations being remote, or widely separated, from each other. The method may further include moving the platform to a first location to conduct medical training of a first group of medical personnel, such as first responders (such as emergency healthcare personnel including paramedics and emergency medical technicians), healthcare providers (such as physicians, physician assistants, certified nurse practitioners, nurses), and the like. The method may then include conducting training in the simulation areas of the platform in the first location with the first group of personnel, which will be described in greater detail below. After the training is completed, the platform may be moved from the first location of training to a second location to conduct medical training with a second group of personnel, and medical training may then be conducted at the second location.

As a result of the highly mobile character of the platform, the second location, as well as third, fourth, fifth (and so forth) locations, may be located relatively remotely from the each other, in the sense that the locations may be tens, hundreds, or even thousands of miles apart from each other. Moreover, the platform is configured with equipment and simulation areas so that none of the locations needs to have specialized facilities in order to conduct training using emergency medical equipment in realistic spaces with realistic medical simulation equipment, and thus personnel to be trained do not have to travel to a distant or centralized location to receive similar training. Further, the training tends to be highly uniform over the different training locations since the same equipment may be used at each training location, and the same training personnel may travel with the platform to the various locations to conduct the training sessions if desired.

In greater detail, the training that is conducted may include one or more predetermined scenarios that might be encountered by the personnel to be trained, and may be directed to various conditions or symptoms that a patient might exhibit. For example, the training scenarios may relate to emergency medical conditions such as, for example, assessing and treating a patient with a hypoglycemia condition. The training scenario may also relate to respiratory conditions such as, for example, assessing and treating an acute asthmatic event. The training scenario may also relate to infection-related conditions such as, for example, assessing and treating septic shock with pneumonia. The training scenario may also relate to trauma-related conditions such as, for example, assessing and treating tension pneumothorax with a ruptured spleen, and/or assessing and treating hemopneumothorax with flail chest and hemorrhage. The training scenario may also relate to cardiac conditions such as, for example, assessing and treating myocardial infarction. The training scenario may also relate to neurological conditions such as, for example, assessing and treating stroke. This listing is illustrative of the scenarios that may be utilized and is clearly not exhaustive, as other scenarios may be utilized. Further, the types of scenarios utilized may be tailored to the age range of the patient simulator mannequin, with scenarios with more age appropriate conditions utilized with the child and infant patient simulation mannequins.

Apart from the particular medical scenarios and conditions simulated, the method of utilizing the platform for training may also include conducting training exercises in both the ambulance simulation area and the emergency room simulation area, and the training exercises may be conducted substantially simultaneously in the areas. The training in the respective areas may be part of the same training exercise, with the ambulance personnel participating in the ambulance simulation area and the emergency room personnel participating in the emergency room simulation area. The method may also include conducting communication by the personnel in the areas between the areas, as if the personnel in the ambulance simulation area were located remotely from the personnel in the emergency room simulation area. The method may also include the step of transferring the simulated patient, such as a patient simulator, between the ambulance and emergency room simulations areas as a part of the training exercise, as if the patient was being transferred from the care of the ambulance personnel to the care of the emergency room personnel.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to.

We claim:

1. A mobile medical simulation platform for training medical emergency personnel, the platform comprising:
   a mobile base movable between remote geographical locations, the mobile base including a main enclosure having a forward end and a rearward end and defining an interior space;
   medical equipment in the interior space of the main enclosure and usable in medical simulation training for treating a human patient; and
   simulation apparatus configured to provide simulation of medical events and conditions of a human patient;
   wherein the interior space of the main enclosure of the mobile base includes at least two medial simulation areas separated from each other within the interior and movable together as a unit from location to location, the medical simulation areas including a combination of:
   a simulation of an interior of a medical practice space of a mobile type contained in a vehicle; and
   a simulation of an interior of a medical practice space of an immobile type contained in a building;
   wherein the medical simulation area having a said medical practice space of a mobile type comprises an ambulance simulation area; and
   wherein the medical simulation area having a said medical practice space of an immobile type comprises an emergency room simulation area;
   wherein the medical simulation area are contained in the main enclosure to permit simultaneous emergency simulation training exercises of ambulance personnel and emergency room personnel to occur in the simulation areas of the main enclosure.

2. The platform of claim 1 wherein the ambulance and emergency room simulation areas of the interior space are in selective communication with each other to permit movement of the simulation apparatus from the ambulance simulation area to the emergency room simulation area.

3. The platform of claim 1 wherein the ambulance simulation area is positioned toward the rearward end of the main enclosure and an ambulance training entrance is located in the rearward end of the main enclosure such that movement through the ambulance training entrance results in entrance into the ambulance simulation area.

4. The platform of claim 3 the emergency room simulation area is positioned toward the forward end of the main enclosure.

5. The platform of claim 1 wherein the interior space includes a control area separating the emergency room simulation area from the ambulance simulation area.

6. The platform of claim 1 wherein the interior space includes a control area positioned between the emergency room simulation area and the ambulance simulation area to provide an observation point from which a person in the control area can simultaneously observe training exercise activities occurring in both of the simulation areas.

7. The platform of claim 1 wherein the main enclosure includes a first separation panel movably positioned between the ambulance simulation area and the control area and a second separation panel being movably positioned between the emergency room simulation area and the control area, each of the separation panels being movable between an open position permitting movement between the areas and a closed position restricting movement between the areas.

8. The platform of claim 7 wherein portions of the separation panels include material permitting one way viewing therethrough from the control area into the ambulance simulation area and from the control area into the emergency room simulation area.

9. The platform of claim 1 wherein the emergency room simulation area is expandable from a transport configuration in which the interior space of the emergency room simulation area is relatively smaller to a simulation configuration in which the interior space of the emergency room simulation area is relatively larger.

10. The platform of claim 1 additionally comprising simulation monitoring apparatus configured to detect and record simulation events occurring in one of the simulation areas of the interior space.

11. The platform of claim 10 wherein the simulation monitoring apparatus comprises a plurality of sensors for sensing trainee activity during simulation events.

12. The platform of claim 11 wherein the plurality of sensors include a plurality of cameras, the cameras including video cameras, some of the plurality of the cameras being mounted on the ceiling wall of the main enclosure.

13. The platform of claim 11 wherein the simulation monitoring apparatus comprises a plurality of display devices for displaying information from the sensors.

14. The platform of claim 11 wherein the simulation monitoring apparatus comprises recording apparatus for recording information detected by the sensors.

15. The platform of claim 1 wherein the simulation apparatus includes at least one patient simulation mannequin positioned in the interior space of the main enclosure and being movable between the ambulance simulation area and the emergency room simulation area.

16. The platform of claim 1 wherein the mobile base comprises a vehicle capable of moving the mobile base under its own power.

17. The platform of claim 1 wherein the main enclosure is configured so that medical personnel are able to move from one of the medical simulation areas to an other one of the medical simulation areas without leaving the main enclosure.

18. A method of training medical personnel using a portable medical simulation platform, comprising:
   providing a portable medical simulation platform comprising a mobile base movable between remote geographical locations, the mobile base including a main enclosure defining an interior space separated into an ambulance simulation area and an emergency room simulation area, the platform further including medical equipment in the interior space usable in medical simulation training and simulation apparatus configured to provide simulation of medical events and conditions of a human patient;
   moving the platform to a first location to conduct medical training of a first group of medical personnel;
   conducting training in the simulation areas of the platform in the first location with the first group of personnel;
   moving the platform from the first location of training to a second location to conduct medical training with a second group of personnel; and
   conducting training in the simulation areas of the platform in the second location with the second group of personnel;

wherein the steps of conducting training include transferring a patient simulator from the ambulance simulation area to the emergency room simulation area by the medical personnel without leaving the interior of the main enclosure.

19. The method of claim 18 wherein at least one of the steps of conducting training includes conducting training exercises in both of the simulation areas substantially simultaneously with ambulance personnel being located in the ambulance simulation area and emergency room simulation personnel being located in the emergency room simulation area, and further includes communicating information between the ambulance personnel in the ambulance simulation area and the emergency room personnel in the emergency room simulation area via an electronic communication device.

* * * * *